(12) United States Patent
Huang et al.

(10) Patent No.: US 8,170,190 B2
(45) Date of Patent: May 1, 2012

(54) METHOD AND SYSTEM FOR MANAGING TELEPHONE NUMBER ALLOCATION

(75) Inventors: Kevin Yang Huang, Tulsa, OK (US); Becky Lynn Reynolds, Bartlesville, OK (US); Godfrey Chisanga, Rowlett, TX (US); Bharath Nelakonda, Lansdowne, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1166 days.

(21) Appl. No.: 11/960,911

(22) Filed: Dec. 20, 2007

(65) Prior Publication Data

US 2009/0161852 A1     Jun. 25, 2009

(51) Int. Cl.
 *H04M 3/42*  (2006.01)
 *G06Q 30/00* (2006.01)

(52) U.S. Cl. ........... 379/201.01; 379/88.17; 379/111; 379/207.15; 379/220.01; 379/242; 455/414.1; 455/415; 705/7.29; 705/14.27; 705/14.52; 705/14.69; 705/342

(58) Field of Classification Search .......... 379/111, 379/201.01, 201.03, 207.15, 220.01, 242, 379/88.17, 218.01; 705/7.29, 14.27, 14.52, 705/14.68, 14.69, 342, 14.54; 455/414.1, 455/415

See application file for complete search history.

(56) References Cited

U.S. PATENT DOCUMENTS

| | | | |
|---|---|---|---|
| 7,106,844 B1 * | 9/2006 | Holland | 379/201.01 |
| 7,263,533 B2 * | 8/2007 | Bauer et al. | 1/1 |
| 7,302,255 B1 * | 11/2007 | Lundy et al. | 455/414.1 |
| 7,395,276 B2 * | 7/2008 | Cuckson et al. | 1/1 |
| 7,424,442 B2 * | 9/2008 | Wong et al. | 705/14.68 |
| 7,639,792 B2 * | 12/2009 | Qiu et al. | 379/207.15 |
| 7,835,941 B2 * | 11/2010 | Zucker | 705/14.27 |
| 7,961,852 B2 * | 6/2011 | Migault et al. | 379/88.17 |
| 2002/0136391 A1 * | 9/2002 | Armstrong | 379/242 |
| 2006/0035629 A1 * | 2/2006 | Kodama et al. | 455/415 |
| 2007/0124207 A1 * | 5/2007 | Faber et al. | 705/14 |
| 2008/0046477 A1 * | 2/2008 | Schultz | 707/201 |
| 2008/0063177 A1 * | 3/2008 | Schultz | 379/220.01 |
| 2008/0126209 A1 * | 5/2008 | Wong et al. | 705/14 |
| 2008/0187122 A1 * | 8/2008 | Baker | 379/218.01 |
| 2008/0275785 A1 * | 11/2008 | Altberg et al. | 705/14 |
| 2009/0144068 A1 * | 6/2009 | Altberg et al. | 705/1 |
| 2009/0161852 A1 * | 6/2009 | Huang et al. | 379/201.01 |
| 2009/0240561 A1 * | 9/2009 | Altberg et al. | 705/10 |

* cited by examiner

*Primary Examiner* — Gerald Gauthier (57) ABSTRACT

A system and method in accordance with exemplary embodiments may include receiving, from a customer, limitation data associated with managing telephone number allocation, determining a limitation threshold based on at least the limitation data, allocating one or more telephone numbers to a customer based on at least the limitation threshold, and providing the one or more telephone numbers to a customer.

20 Claims, 5 Drawing Sheets

METHOD AND SYSTEM FOR MANAGING TELEPHONE NUMBER ALLOCATION

BACKGROUND INFORMATION

Some resellers may request one or more telephone numbers from a telephone number provider. Given the dynamic nature of the demand for telephone numbers by telephone number end users, resellers may demand more or less telephone numbers from telephone number service providers. A reseller may assign a telephone number to a particular end user. In some instances, however, the reseller and telephone number end user may realize that the assigned telephone number has been allocated to another telephone number end user.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

A system and method in accordance with exemplary embodiments may include receiving, from a customer, limitation data associated with managing telephone number allocation, determining a limitation threshold based on at least the limitation data, allocating one or more telephone numbers to a customer based on at least the limitation threshold, and providing the one or more telephone numbers to a customer.

The description below describes servers, customer systems, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components (e.g., a server) local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, mobile devices, and network elements, etc.) separately. The functions described as being performed at various components may be performed at other components, and the various components may be combined and/or separated. Other modifications also may be made.

Figure 1:
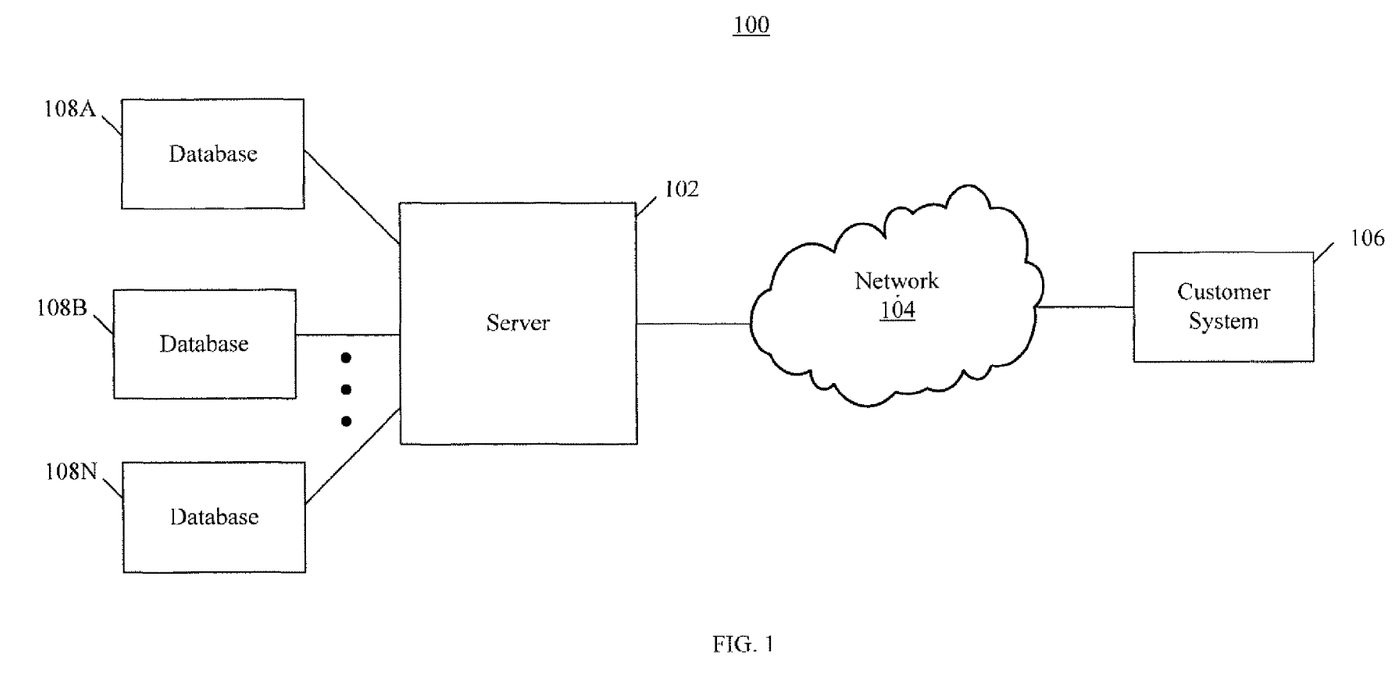
FIG. 1 illustrates a system in accordance with exemplary embodiments.

FIG. 1 illustrates a telephone number allocation system 100 in accordance with exemplary embodiments. The server 102 may be communicatively coupled to one or more customer systems 106 via one or more networks 104. A customer system 106 may be associated with a customer, such as, a reseller. In an exemplary embodiment, a reseller may include a company with a plurality of employees, a cable television company that may provide Voice Over Internet Protocol (VOIP) telephone services, an internet service provider company providing VOIP services, and/or any other company and/or organization that may utilize and/or assign telephone numbers in bulk. For example, a company may have 100 employees and may need enough telephone numbers to assign each employee a unique telephone number. It should be noted that the phrase "end-user" is used to refer to an entity and/or individual that may access and/or use a service associated with a telephone number. In the previous example, an employee may be considered an end-user.

The server 102 may receive request messages and/or limitation data from a customer system 106. The request messages may include request data associated with a customer requesting one or more telephone numbers from the telephone number allocation system 100. In an exemplary embodiment, request data may include a unique customer identification number associated with a customer, a customer name, a customer address, and/or any other information that may be used to process a request for one or more telephone numbers from a customer. Based on the request messages, the server 102 may create, access, and/or store one or more records associated with the customer in a database.

The limitation data may include customer inventory data, customer forecast data, and/or customer usage data. In an exemplary embodiment, customer inventory data may include data associated with the amount of telephone numbers currently allocated to a particular customer. Customer forecast data may include data associated with an amount of perspective end-users. Customer usage data may include data associated with an amount of end-users to which a telephone number has been assigned. Based on the limitation data, the server 102 may determine a limitation threshold associated with the customer and allocate one or more telephone numbers to a telephone number pool associated with the customer. A limitation threshold may include a maximum amount of telephone numbers that may be allocated to a particular customer. A telephone number pool may include a collection of one or more scrubbed telephone numbers, the amount of which do not exceed the limitation threshold, that are associated with a customer. The telephone number pool may be stored in server 102 and/or in one or more databases 108 associated with server 102. Prior to allocating one or more telephone numbers to a telephone number pool, the server 102 may scrub one or more telephone numbers. Scrubbing may include scanning one or more databases 108 associated with the server 102 to ensure that a particular telephone number has not been previously allocated to another customer. The server 102 may also provide the telephone number pool to the customer system 106.

In an exemplary embodiment, the server 102 may receive a request from a customer system 106 for one or more telephone numbers. The server 102 may also receive limitation data from the customer system 106. Based on this request and the limitation data, the server 102 may determine a limitation threshold based on the limitation data. The server 102 may access and scrub an amount of telephone numbers that is less than the limitation threshold. The server 102 may assign the one or more scrubbed telephone numbers to a telephone number pool associated with the customer. In addition, the server 102 may manage the telephone number pool on behalf of the customer system 106 to ensure the telephone number pool remains stocked with scrubbed telephone numbers as much as the limitation threshold may allow.

In exemplary embodiments, the telephone number allocation system 100 may include a server 102 communicatively coupled to a network 104, one or more databases 108 communicatively coupled to the server 102, and one or more customer systems 106 communicatively coupled to the network 104. The network 104 may communicate request messages and/or limitation data from the customer system 106 to the server 102. The network 104 may also allow the customer system 106 to access a telephone number pool associated with the customer system 106.

In an exemplary embodiment, a customer associated with the telephone number allocation system 100 may communicate request data and/or limitation data via a customer service representative associated with the telephone number allocation system 100. The customer service representative may input request data and/or limitation data into the telephone number allocation system 100 via a customer representative system (not shown).

The network 104 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In an exemplary embodiment, the network 104 may include one or more networks operating as a stand-alone network or in cooperation with each other. Use of the term network herein is not intended to limit the network to a single network.

In an exemplary embodiment, the customer system 106 may be a hardware device that may communicate request messages and/or limitation data to the network 104, may cause access of a telephone number pool associated with the customer system 106 using the network 104, and may receive messages from the network 104. The customer system 106 may include, but is not limited to, a computer device, a communication device, a personal computer (PC), a workstation, a mobile device, a telephone, a handheld PC, a personal digital assistant (PDA), a thin system, a fat system, a network appliance, an Internet browser, a paging device, an alert device, a television, an interactive television, a receiver, a tuner, a high definition (HD) television, an HD receiver, a video-on-demand (VOD) system, a server, or any other communication device capable of transmitting request messages and/or limitation data and/or accessing a telephone number pool. In an exemplary embodiment, the customer system 106 may also include an interface to display information received from the telephone number allocation system 100 over the network 104.

It is noted that telephone number allocation system 100 illustrates a simplified view of various components included in a telephone number allocation system 100, and that other hardware devices and software not depicted may be included in the telephone number allocation system 100. It is also noted that the telephone number allocation system 100 illustrates only a single server 102, a single network 104, and a single customer system 106. It will be appreciated that multiple instances of these devices may be used. The server 102 is discussed in further detail below.

Figure 2:
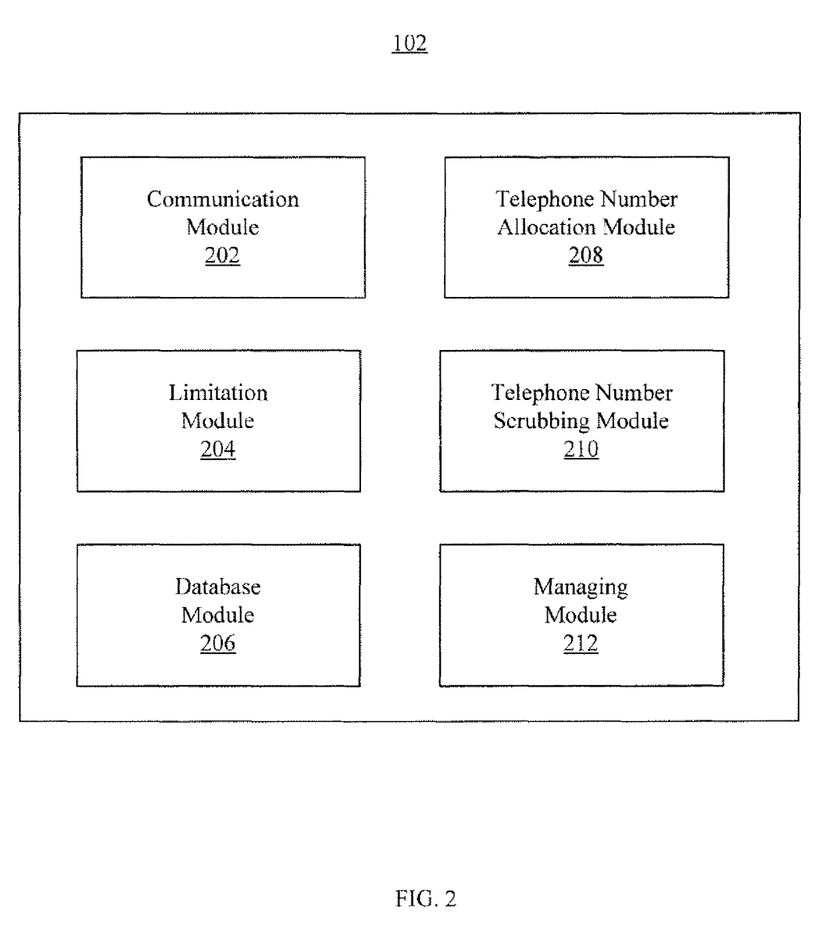
FIG. 2 illustrates exemplary modules of a server in accordance with exemplary embodiments.

FIG. 2 illustrates various modules of the server 102 in accordance with exemplary embodiments. In an exemplary embodiment, the server 102 may include a communication module 202, a limitation module 204, a database module 206, a telephone number allocation module 208, a telephone number scrubbing module 210, and a managing module 212. It is noted that the modules 202, 204, 206, 208, 210, and 212 are exemplary. The functions of the modules 202, 204, 206, 208, 210, and 212 may be performed at other modules remote or local to the server 102, and the modules 202, 204, 206, 208, 210, and 212 may be combined and/or separated.

The communication module 202 may receive request messages and/or limitation data from a customer system 106 and communicate the request messages and/or limitation data to the server 102 using the network 104. The communication module 202 also may communicate messages received from the other modules 204, 206, 208, 210, and 212 to the network 104, and may communicate messages to the other modules 204, 206, 208, 210, and 212 received from the network 104. The communication module 202 may also allow a customer system 106 to access a telephone number pool associated with the customer system 106 using the network 104.

The limitation module 204 may receive and/or have access to limitation data associated with a particular customer. The limitation module 204 may include software and/or hardware to store and/or analyze limitation data to determine a limitation threshold associated with the customer system 106. Limitation data may include customer inventory data, customer forecast data, and/or customer usage data. In an exemplary embodiment, customer inventory data may include data associated with the amount of telephone numbers currently allocated to a particular customer. For example, a customer may have 1,000 telephone numbers currently allocated to the customer. Customer forecast data may include data associated with an amount of perspective end-users. For example, a customer may expect to increase the number of end-users being serviced by 20% within the next month. Customer usage data may include data associated with an amount of end-users assigned telephone numbers. For example, a customer may have 90% of telephone numbers assigned to end-users.

A limitation threshold may include a maximum amount of telephone numbers that may be allocated to a particular customer based on the limitation data. For example, a customer may be a cable television company that provides VOIP services to end-users. Further, the cable company may currently service 1,000 end-users and plan to service an additional 1,000 end-users in the near future. Accordingly, the perspective increase in end-users may result in an increase of 100% of the number of current end-users associated with the customer. Based on this and/or additional limitation data, the limitation module 204 may determine the appropriate limitation threshold to be 1,000. In an exemplary embodiment, the 1,000 limitation threshold may provide all the telephone numbers necessary to meet the customer's demands based on the customer's forecast data.

In an exemplary embodiment, the limitation module 204 may also set the limitation threshold above or below the requisite amount of telephone numbers necessary to meet customer demands based on other limitation data. For example, despite forecast data that indicates the amount of end-users to increase by 1,000, the limitation module 204 may determine the limitation threshold amount to be 500 based on past usage data that shows a pattern of a customer only using 50% of the telephone numbers allowed by the limitation threshold. Likewise, despite forecast data that indicates the amount of end-users to increase by 1,000, the limitation module 204 may determine the limitation threshold amount to be 2,000 based on past usage data that shows a pattern of a customer needing 100% more of the telephone numbers allowed by the limitation threshold.

It should be noted that the limitation threshold may be determined based on a set of rules pre-determined by the implementers of the telephone number allocation system 100. Such rules may include the rules applied in determining the limitation threshold provided in the examples above. In an exemplary embodiment, one or more rules may be based on forecast, utilization, inventory levels, and/or trending. The limitation threshold may also be determined by a representative associated with the telephone number allocation system.

The limitation module 204 may also access additional limitation data after a limitation threshold amount has previously been determined. Accordingly, the limitation module 204 may use the additional limitation data to determine a new limitation threshold based on the most recent and/or accurate limitation data.

The server 102 may include database module 206 operable to access and store various information in one or more databases 108. The database module 206 may include any device for accessing and storing various information in one or more databases 108. In various embodiments, one or more databases 108 may store data regarding one or more customers and a plurality of telephone numbers. This data may include request data, limitation data, and/or one or more telephone numbers associated with a telephone number pool. The communication module 202, the limitation module 204, telephone number allocation module 208, telephone number scrubbing module 210, and managing module 212 may be coupled to one or more databases 108 such that the communication module 202, the limitation module 204, telephone number allocation module 208, telephone number scrubbing module 210, and managing module 212 may access one or more databases 108 through the database module 206 to store and retrieve data as needed.

The telephone number scrubbing module 210 may be configured to access and/or retrieve one or more telephone numbers. The telephone number scrubbing module 210 may include software and/or hardware to access and/or retrieve one or more telephone numbers, scan one or more databases for the one or more telephone numbers, discard one or more telephone numbers if found to be previously allocated to another customer, associate one or more scrubbed telephone numbers to a customer identification number associated with the customer associated with the telephone number pool, and/or store the one or more scrubbed telephone number in a telephone number pool associated with the customer system 106.

The telephone number scrubbing module 210 may be configured to access and/or retrieve one or more telephone numbers from the telephone number allocation system 100. The telephone number scrubbing module 210 may also be configured to scrub the one or more telephone numbers. Scrubbing the one or more telephone numbers may include scanning one or more databases 108 associated with the server 102 to determine if a particular telephone has been previously allocated to another customer. If, for example, the telephone number scrubbing module 210 determines that the one or more telephone numbers have been previously allocated to another customer, the telephone number scrubbing module 210 may discard the one or more telephone numbers. If, however, the telephone number scrubbing module 210 determines that the one or more telephone numbers have not been previously allocated to another customer, the telephone number scrubbing module 210 may associate a customer identification with the one or more telephone numbers and may assign the one or more telephone numbers to a telephone number pool associated with a customer system 106.

The telephone number scrubbing module 210 may determine whether the one or more telephone numbers have been previously allocated to another customer by scanning records associated with the one or more telephone numbers in one or more databases 108. If a record is associated with data indicating pre-allocation such as a customer identification number and/or a customer name, the telephone number may be determined to have been previously allocated to another customer.

For example, the telephone number scrubbing module 210 may access and/or retrieve the telephone number 555-555-5555 from the telephone number allocation system 100. The telephone number scrubbing module 210 may then scan each database 108 associated with server 102 to determine whether the telephone number 555-555-5555 has been previously allocated to another customer using software and/or hardware configured to scan database records. If, for example, the telephone number scrubbing module 210 determines that the 555-555-5555 telephone number has been previously allocated to another customer, the telephone number scrubbing module 210 may discard the telephone number. If, however, the telephone number module 210 determines that the 555-555-5555 telephone number has not been previously allocated to another customer, the telephone number scrubbing module 210 may associate a customer identification number associated with the telephone number pool to the telephone number and store the telephone number in the telephone number pool.

The telephone number scrubbing module 210 may also be configured to decrease the limitation threshold based on the amount of telephone numbers assigned to the telephone number pool. For example, a customer associated with a 1,000 limitation threshold may request 500 telephone numbers. Based on this data, the telephone number scrubbing module 210 may retrieve, scrub, and/or assign 500 telephone numbers to a telephone number pool associated with the customer. The telephone number scrubbing module 210 may then decrease the limitation threshold by the 500 telephone number amount assigned to the telephone number pool. Accordingly, the 500 limitation threshold may then be updated and/or stored in the telephone number allocation system 100.

The telephone number allocation module 208 may receive request data and/or the limitation threshold as input. The telephone number allocation module 208 may include software and/or hardware to allocate one or more telephone numbers to a customer based on the request data and the limitation threshold.

The telephone number allocation module 208 may also be configured to provide the telephone number pool to the customer via a customer system 106 once one or more telephone numbers are assigned to the telephone number pool. The server 102 may allow a customer to designate one or more telephone numbers associated with the telephone number pool as reserved using request messages. For example, a customer may select a particular telephone number from the telephone number pool and may assign that particular telephone number to a particular end-user. The reserved telephone number may remain in the telephone number allocation system 100 in reserved status for a short period of time. During this short period of time the customer may select a different telephone number to associate with the end-user and/or remove the telephone number from reserved status. The server 102 may record and/or store this reservation data as current usage data.

The managing module 212 may access the server 102 and/or one or more databases 108 to monitor the telephone number pool. The managing module 212 may include software and/or hardware to monitor the telephone number pool to determine when the total amount of telephone numbers associated with the telephone number pool has been reserved and/or assigned to a particular end-user. If, for example, all the telephone numbers associated with the telephone number pool have been reserved and/or assigned to a particular end-user, the managing module 212 may replenish the telephone number pool with additional telephone numbers. If, however, all the telephone numbers associated with the telephone number pool have not been reserved and/or assigned to a particular end-user, managing module 212 may continue to monitor the telephone number pool.

Figure 3:
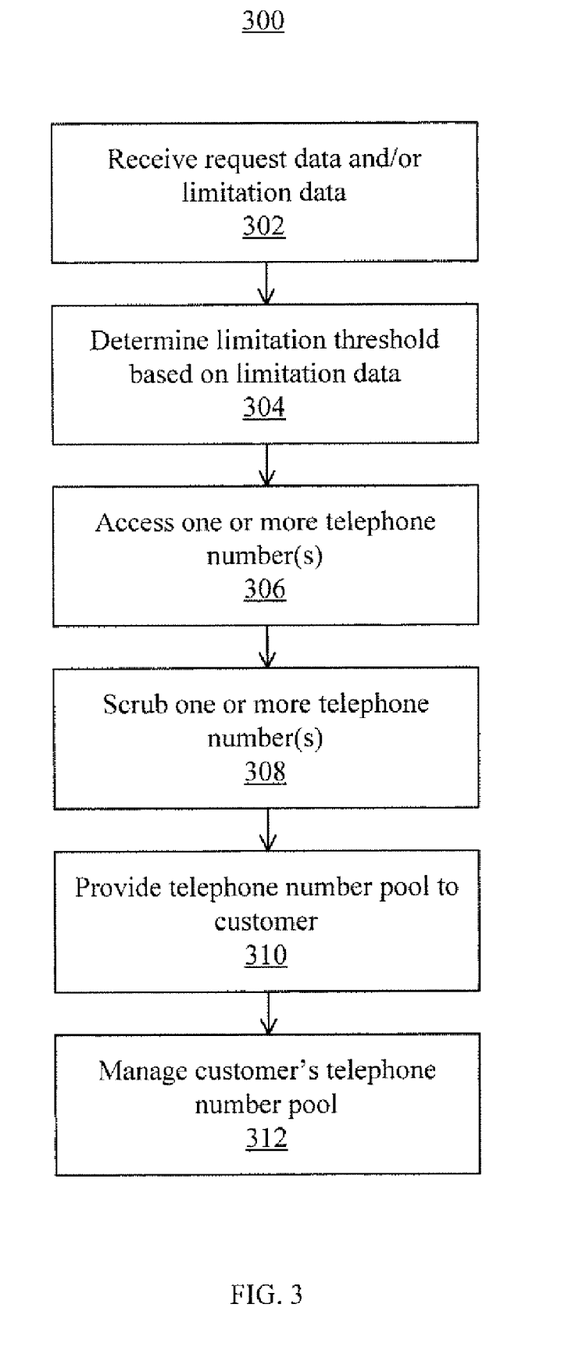
FIG. 3 illustrates a method for managing telephone number allocation in accordance with exemplary embodiments.

FIG. 3 illustrates a method for managing telephone number allocation in accordance with exemplary embodiments. This exemplary method is provided by way of example, as there are a variety of ways to carry out methods disclosed herein. The method 300 shown in FIG. 3 can be executed or otherwise performed by one or a combination of various systems. The method 300 is described below as carried out by the telephone number allocation system 100 shown in FIG. 1 by way of example, and various elements of the telephone number allocation system 100 are referenced in explaining the example method of FIG. 3. Each block shown in FIG. 3 represents one or more processes, methods, or subroutines carried in the exemplary method 300. Referring to FIG. 3, the exemplary method 300 may begin at block 302.

In block 302, the method 300 may receive and/or access request messages and/or limitation data from the customer. For example, method 300 may receive and/or access request messages and/or limitation data from the customer via the customer system 106 using the network 104. The request messages may include request data associated with a customer requesting one or more telephone numbers from the telephone number allocation system 100. In an exemplary embodiment, request data may include any needed information that may be used to process a request for one or more telephone numbers from a customer. For example, the server 102 may receive a customer identification number associated with a customer and a request for 500 telephone numbers as request data.

The limitation data may include customer inventory data, customer forecast data, and/or customer usage data. In an exemplary embodiment, customer inventory data may include data associated with the amount of telephone numbers allocated to a particular customer. Customer forecast data may include data associated with an amount of perspective end-users. Customer usage data may include data associated with an amount of end-users assigned telephone numbers. The method 300 may continue to block 304.

In block 304, the method 300 may include determining a limitation threshold based on the limitation data. A limitation threshold may include a maximum amount of telephone numbers that may be allocated to a particular customer based on the limitation data. For example, a customer may be a cable television company that provides VOIP services to end-users. Further, the cable company may currently service 1,000 end-users and plan to service an additional 1,000 end-users in the near future. Accordingly, the perspective increase in end-users may result in an increase of 100% of the number of current end-users associated with the customer. Based on this and/or additional limitation data, the limitation module 204 may determine the appropriate limitation threshold to be 1,000. In an exemplary embodiment, the 1,000 limitation threshold may provide all the telephone numbers necessary to meet the customer's demands based on the customer's forecast data. The method 300 may continue to block 306.

In block 306, the method 300 may include accessing and/or retrieving one or more telephone numbers. For example, a telephone number scrubbing module 210 may access and/or retrieve one or more telephone numbers based on the request messages and/or limitation threshold. The method 300 may continue to block 308.

In block 308, the method 300 may include scrubbing the one or more telephone numbers and assigning the one or more scrubbed telephone numbers to a telephone number pool. A telephone number pool may include a number of telephone numbers allocated to a particular customer not more than the limitation threshold. Scrubbing one or more telephone numbers may include scanning one or more databases 108 associated with server 102 to determine if a particular telephone has been previously allocated to another customer. The method 300 may continue to block 310.

In block 310, the method 300 may include providing the telephone number pool to a customer via a customer system 106. The server 102 may allow a customer to designate one or more telephone numbers associated with the telephone number pool as reserved using request messages. For example, a customer may select a particular telephone number from the telephone number pool and may assign that particular telephone number to a particular end-user. The reserved telephone number may remain in the telephone number allocation system 100 in reserved status for a short period of time. During this short period of time the customer may select a different telephone number to associate with the end-user and/or remove the telephone number from reserved status. The server 102 may record and/or store this reservation data as current usage data. The method 300 may continue to block 312.

In block 312, the method 300 may include managing a telephone number pool associated with a customer. Further details for managing a telephone number pool are provided below. The method 300 may then end.

Figure 4:
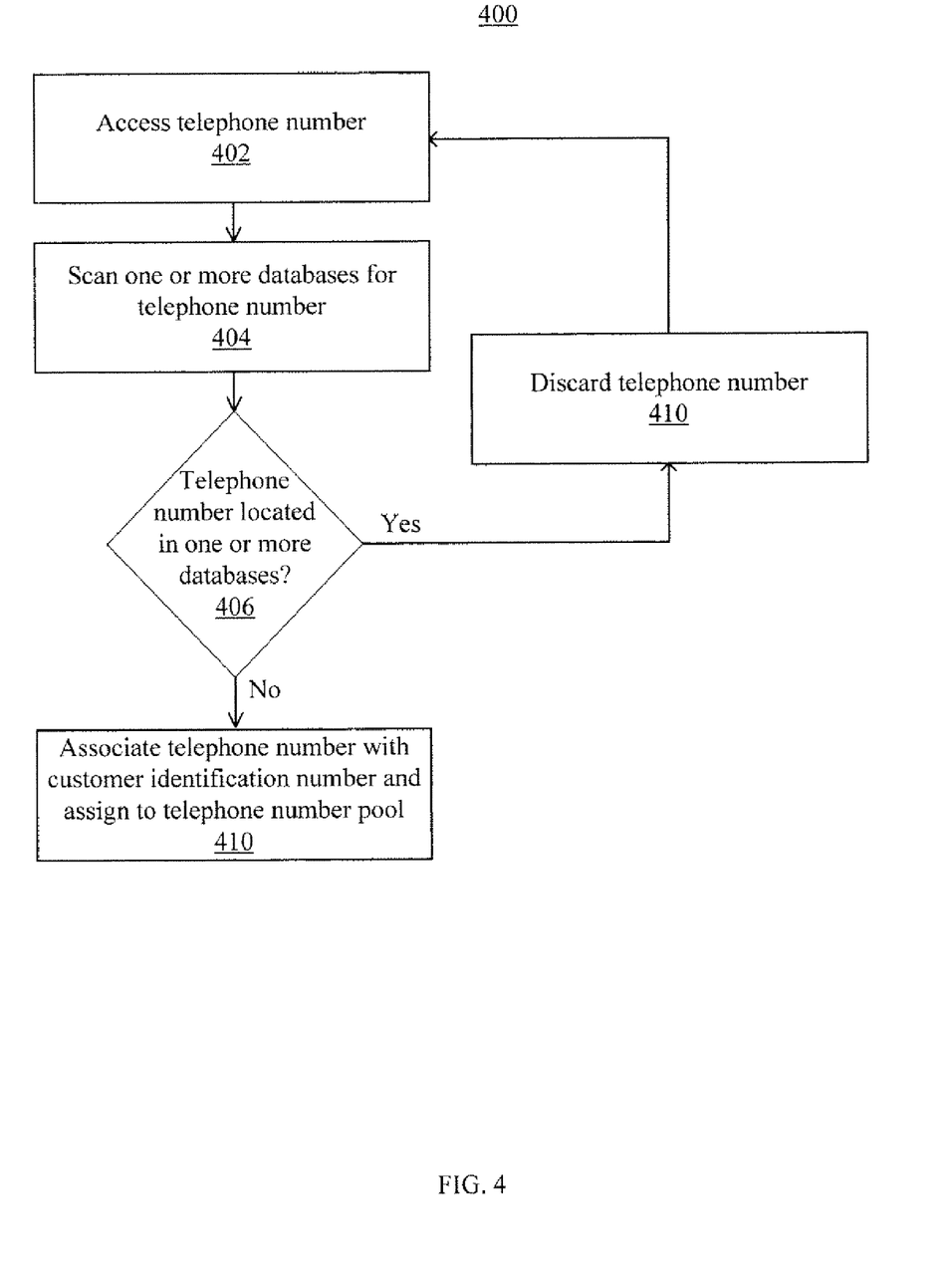
FIG. 4 illustrates a method for scrubbing one or more telephone numbers in accordance with exemplary embodiments.

FIG. 4 illustrates a method for scrubbing one or more telephone numbers in accordance with exemplary embodiments. This exemplary method is provided by way of example, as there are a variety of ways to carry out methods disclosed herein. The method 400 shown in FIG. 4 can be executed or otherwise performed by one or a combination of various systems. The method 400 is described below as carried out by the telephone number allocation system 100 shown in FIG. 1 by way of example, and various elements of the telephone number allocation system 100 are referenced in explaining the example method of FIG. 4. Each block shown in FIG. 4 represents one or more processes, methods, or subroutines carried in the exemplary method 400. Referring to FIG. 4, the exemplary method 400 may begin at block 402.

In block 402, the method 400 may include accessing and/or retrieving one or more telephone numbers from the telephone number allocation system 100. For example, the server 102 may access and/or retrieve the telephone number 555-555-5555. The method 400 may continue to block 404.

In block 404, the method 400 may include scanning one or more databases 108 associated with server 102 to determine if a particular telephone has been previously allocated to another customer. For example, the server 102 may scan each database 108 associated with server 102 to determine whether the telephone number 555-555-5555 has been previously allocated to another customer by scanning records. The method 400 may continue to block 406.

In block 406, if, for example, the server 102 determines that the 555-555-5555 telephone number has been previously allocated to another customer, the server 102 may discard the telephone number in block 410. If, however, the server 102 determines that the 555-555-5555 telephone number has not been previously allocated to another customer, the server 102 may associate a customer identification number associated with the telephone number pool to the telephone number in block 408. The method 400 may then end.

Figure 5:
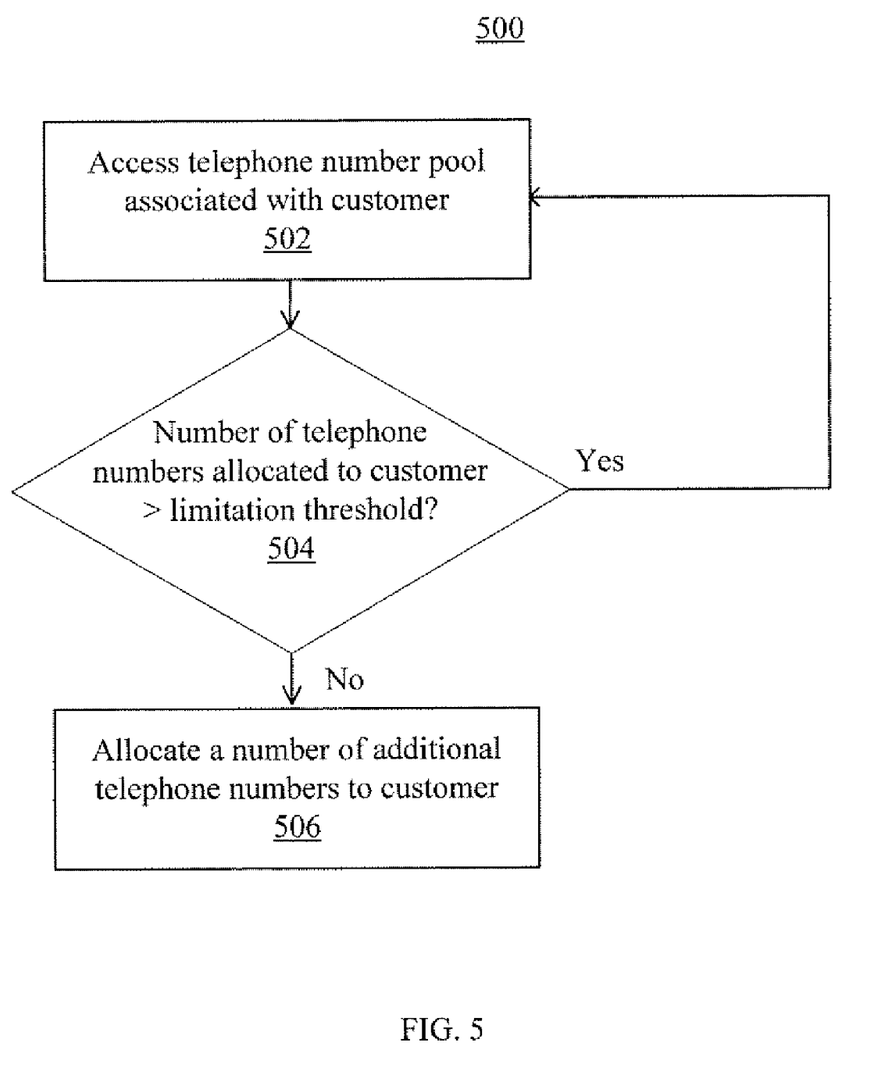
FIG. 5 illustrates a method for managing a telephone number pool in accordance with exemplary embodiments.

FIG. 5 illustrates a method for managing a telephone number pool in accordance with exemplary embodiments. This exemplary method is provided by way of example, as there are a variety of ways to carry out methods disclosed herein. The method 500 shown in FIG. 5 can be executed or otherwise performed by one or a combination of various systems. The method 500 is described below as carried out by the telephone number allocation system 100 shown in FIG. 1 by way of example, and various elements of the telephone number allocation system 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

In block 502, the method 500 may include accessing a telephone number pool stored on one or more databases 108 associated with a customer. Accessing may include scanning records associated with a telephone number pool. The method 500 may then continue to block 504.

In block 504, if, for example, all the telephone numbers associated with the telephone number pool have been reserved and/or assigned to a particular end-user and this number is less than the limitation threshold, the server 102 may replenish the telephone number pool with additional telephone numbers in block 506 and method 500 may end. It however, all the telephone numbers associated with the telephone number pool have not been reserved and/or assigned to a particular end-user, the server 102 may continue to monitor the telephone number pool in block 502.

In block 506, the method 500 may include the steps of method 300 and method 400. The method 500 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   receiving, from a customer, limitation data associated with managing telephone number allocation;
   using a computer processor, determining a limitation threshold based on at least the limitation data;
   using the computer processor, allocating one or more telephone numbers to the customer based on at least the limitation threshold; and
   providing the one or more telephone numbers to the customer.

2. The method of claim 1, further comprising receiving a request for one or more telephone numbers from the customer.

3. The method of claim 1, wherein the customer is a reseller.

4. The method of claim 1, wherein limitation data includes at least one of customer inventory data, customer forecast data, and customer usage data.

5. The method of claim 1, further comprising creating a telephone number pool associated with the customer.

6. The method of claim 5, wherein the telephone number pool comprises a number of telephone numbers less than or equal to the limitation threshold.

7. The method of claim 5, further comprising:
   using the computer processor, scrubbing one or more telephone numbers associated with the telephone number pool.

8. The method of claim 7, wherein scrubbing one or more telephone numbers comprises scanning one or more databases for the one or more telephone numbers associated with the telephone number pool.

9. The method of claim 7, wherein scrubbing one or more telephone numbers further comprises associating the one or more telephone numbers with a customer identification number.

10. The method of claim 5, further comprises:
    using the computer processor, managing the telephone number pool.

11. The method of claim 10, wherein managing the telephone number pool further comprises monitoring an amount of telephone numbers associated with the telephone number pool based on the limitation threshold.

12. The method of claim 11, wherein managing the telephone number pool further comprises allocating one or more additional telephone numbers to the telephone number pool at least based on limitation data.

13. A computer readable media comprising code to perform the acts of the method of claim 1.

14. A system, comprising:
    a database for storing data associated with managing telephone number allocation; and
    a network element communicatively coupled to a network and configured to:
    receive data from a customer wherein the data comprises information relating at least in part to managing telephone number allocation,
    allocate one or more telephone numbers to the customer based on at least a limitation threshold associated with the data, and
    provide the one or more telephone numbers to the customer.

15. The system of claim 14, wherein data includes at least one of customer inventory data, customer forecast data, and customer usage data.

16. The system of claim 14, wherein the network element is further configured to allocate one or more telephone numbers by creating a telephone number pool associated with the customer.

17. The system of claim 16, wherein the network element is further configured to scrub one or more telephone numbers associated with the telephone number pool.

18. The system of claim 16, wherein the network element is further configured to manage the telephone number pool.

19. The system of claim 18, wherein the network element is further configured to manage the telephone number pool by allocating one or more additional telephone numbers to the telephone number pool at least based on the limitation data.

20. A method, comprising:
  receiving a request for one or more telephone numbers from a customer;
  receiving, from the customer, limitation data associated with managing telephone number allocation;
  using a computer processor, determining a limitation threshold based on at least the limitation data;
  using the computer processor, allocating one or more telephone numbers to the customer based on at least the limitation threshold;
  using the computer processor, scrubbing one or more telephone numbers associated with a telephone number pool; and
  providing the one or more telephone numbers to the customer.

* * * * *